Figure 1:
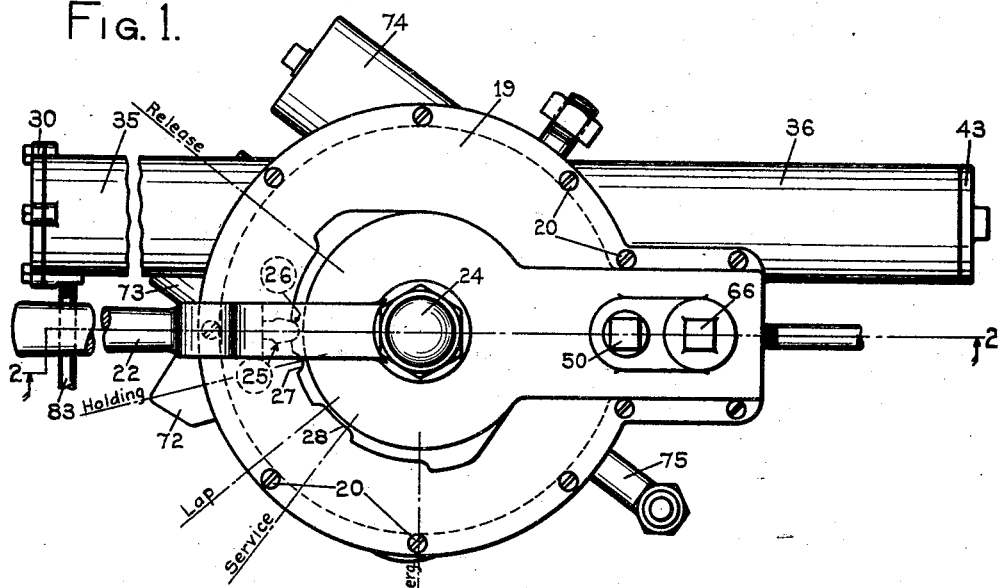

May 10, 1927.

C. S. BUSHNELL 1,628,452

TRAIN CONTROL

Filed Aug. 12, 1922

2 Sheets-Sheet 1

INVENTOR
C. S. Bushnell.
BY Neil W. Beston.
his ATTORNEY

May 10, 1927.  
C. S. BUSHNELL  
1,628,452  
TRAIN CONTROL  
Filed Aug. 12, 1922 2 Sheets-Sheet 2
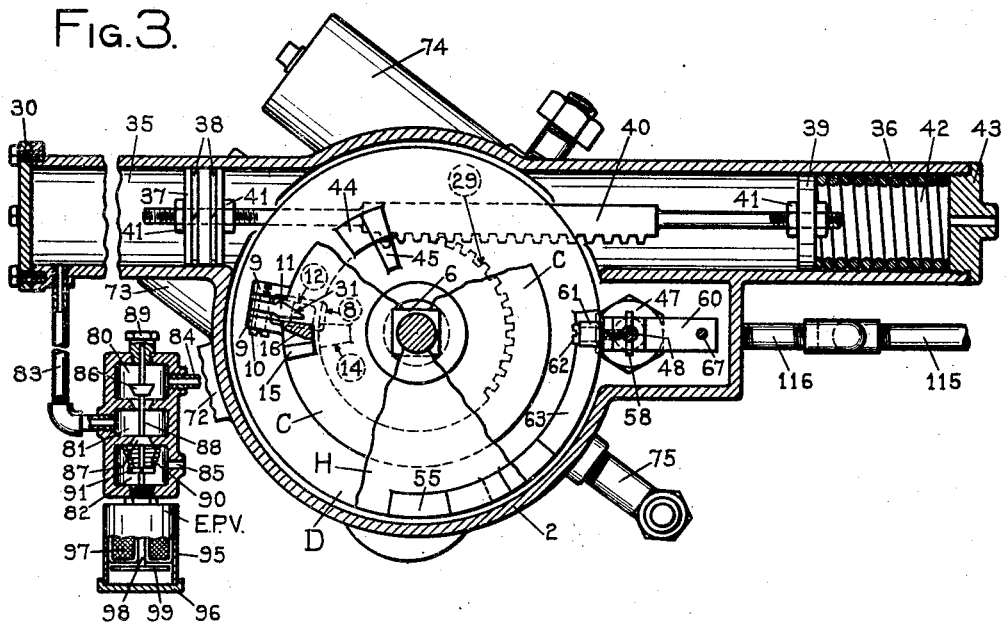
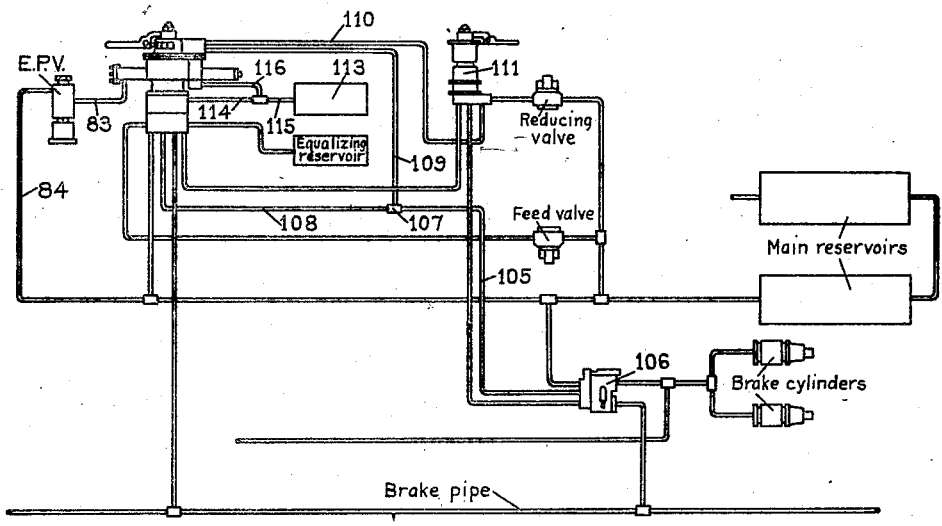

Patented May 10, 1927.

1,628,452

UNITED STATES PATENT OFFICE.

CHARLES S. BUSHNELL, OF ROCHESTER, NEW YORK, ASSIGNOR TO GENERAL RAILWAY SIGNAL COMPANY, OF GATES, NEW YORK, A CORPORATION OF NEW YORK.

TRAIN CONTROL.

Application filed August 12, 1922. Serial No. 581,407.

This invention relates to automatic train control systems, and more particularly to apparatus used in connection with the usual air brake equipment for applying the brakes automatically.

In applying automatic devices for controlling the movement of trains in accordance with traffic and trackway conditions in advance, it is desirable, for well-known reasons, to use the regular air-brake system already on the train; but difficulties are encountered in enforcing an automatic brake application with safety and in a manner so that it can not be forestalled by the engineer.

In order to make a brake application by suitable automatic apparatus acting on the usual air brake equipment, it is necessary to vent air from the brake pipe. Since, however, the engineer's brake valve when in its usual running position continually feeds air into the brake pipe through the feed valve, it is advisable to do more than merely open the brake pipe to atmosphere to cause a proper brake application, that is, a brake application which will not enable the triple valves located on the cars of the following train to move into emergency and apply the brakes so severely as to endanger the railway equipment. The engineer may also partially or wholly prevent an automatic brake application if accomplished by merely venting the brake pipe, by throwing his brake valve to the release position, thereby connecting main reservoir pressure directly to the brake pipe.

When a brake application is made by venting the brake pipe of the usual air brake system, regardless of how this venting is accomplished, the brakes are fully applied before the brake pipe pressure has been reduced to zero. This is because the amount of reduction to make a full brake application is only that reduction which is necessary to make the brake cylinder pressure equal to the auxiliary reservoir pressure, and depends on the ratio of the volume of the brake cylinders to that of the auxiliary reservoir on each car. Venting of the brake pipe pressure beyond this point, where further venting does nothing toward giving a stronger brake application, is an undesirable waste of air.

In the engine and tender air brake equipment, commonly known as the Westinghouse E. T. air brake equipment, in connection with which the present invention has been illustrated, are provided two brake valves. One of these valves is known as the automatic brake valve and is used to apply and release the brakes of the engine and tender and the train brakes simultaneously, and the other, known as the independent brake valve, which is used to apply and release the engine and tender brakes independently of the rest of the train. This E. T. equipment facilitates further flexibility of operation of the brakes by allowing the engine and tender brakes to be released after having been applied by the automatic brake valve with the rest of the train brakes, by the operation of the independent valve; and further by allowing the engine and tender brakes to be again applied after having been released in this manner.

The principal objects and purposes of the present invention, with reference to the peculiarities of the automatic air brake and E. T. equipment which have been considered above, consist in the provision of an engineer's brake valve operator which is normally held in its inactive position by pressure fluid, and which is constructed and arranged to disconnect the engineer's operating handle in a manner to allow him to apply the brakes under any condition, but which will not allow him to operate the valve portion of the automatic brake valve to the running or release position when an application is being made by the automatic apparatus; to provide means to allow only a predetermined reduction of pressure in the brake pipe when a brake application is made by the automatic apparatus, without in any way interfering with the safe manual operation of the brakes of the train; and to provide means to prevent the release of the engine and tender brakes by the engineer by the actuation of the independent brake valve while the brakes are being applied automatically by the brake valve operator.

Various other objects, purposes and characteristic features of the present invention will appear as the description thereof progresses.

Figure 2:
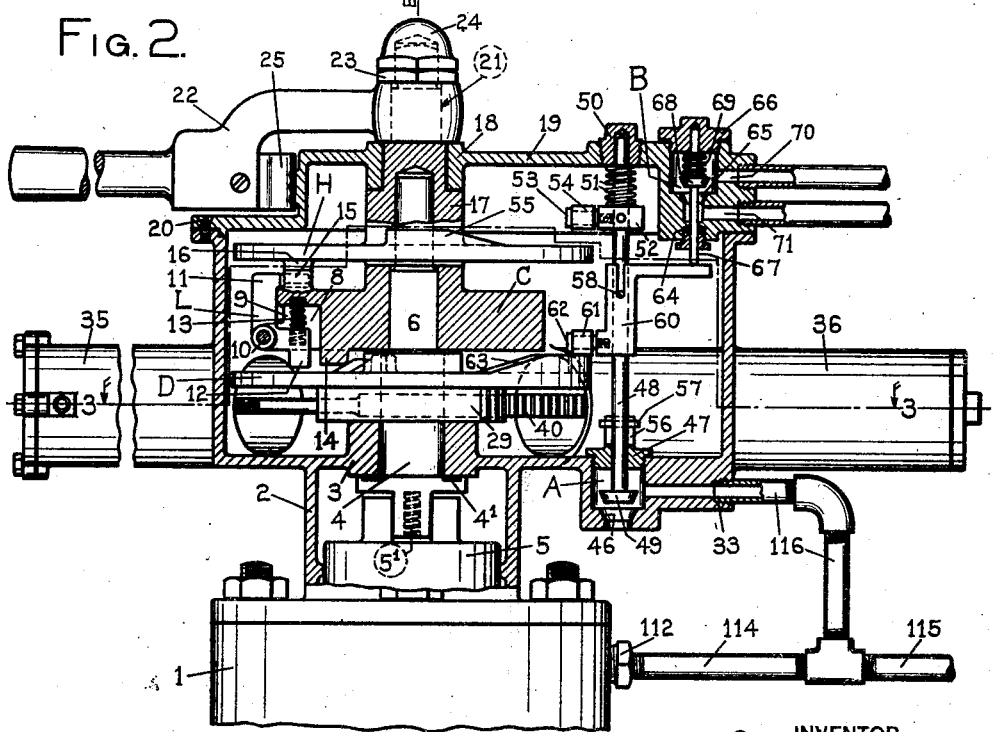

In the accompanying drawings, Figure 1 illustrates a plan view of a brake valve operator embodying the present invention when applied to the automatic brake valve of the Westinghouse E. T. 6 air brake equipment, having its handle in its normal running position;

Fig. 2 is a sectional elevation taken on the line 2—2 of Fig. 1;

Fig. 3 is a horizontal section of the brake valve operator taken on the line 3—3 of Fig. 2, showing in section an electrically operated pneumatic valve illustrated in the vertical position, and connected to the cylinder of the brake valve operator; and Fig. 4 is a piping diagram of the Westinghouse E. T. 6 air brake equipment slightly modified to accommodate the apparatus embodying the present invention.

In describing the present invention, only the devices supplemented upon the usual automatic air brake valve will be described in detail.

Referring particularly to Fig. 2, the reference character 1 illustrates the body portion of the H—6 automatic brake valve used in the Westinghouse E. T. 6 air brake equipment, having the brake valve operator casing 2 substituted for the usual top cover. This casing 2 is provided with a bearing portion 3 in which is pivotally supported the valve shaft 4 terminating at its lower end to form a flange and key, and provided with a gasket $4^1$ between the flange and bearing 3, which is adapted for operating the valve member 5 either manually or by an automatic operator to be described hereinafter. The valve shaft 4 is urged upward to make an air-tight connection by the spring $5^1$.

This valve shaft 4 is provided with a square portion 6 upon which is fixedly mounted the valve collar C. The valve collar C is provided with a pocket 8 on the opposite side of which are outwardly extending lugs 9 perforated to receive the trunnion 10 for pivotally supporting the latch member L. This latch member comprises a latching arm 11 and a trigger arm 12, and is held in its normal locking position by a spring 13. The valve shaft collar C is also provided with a downwardly extending lug 14, and also with an upwardly extending lug 15 spaced a short distance in front of the latching arm as viewed in Fig. 2 (see Fig. 3.)

Loosely mounted on the upper extremity and round portion of the valve shaft 4 is mounted a handle plate H, having a downwardly extending lug 16 extending between the latching arm 11 and the lug 15, both of which are carried by the valve shaft collar C. It is thus seen that under normal conditions, the handle plate H is in rigid locked engagement with the valve shaft collar C, which in turn is mounted on a square portion of the valve shaft 4 operatively connected to the valve 5. This valve plate H is provided with a bushed extension 17 journaled in the bearing portion 18 of the top cover plate 19, which is fastened to the housing of the brake valve operator casing by screws 20. The extreme top portion of the bushed extension 17 of the handle plate H is squared as shown at 21, and has the handle 22 rigidly fastened thereto by the nut 23 and cap screw 24. The handle 22 is provided with a spring latching pawl 25 adapted to frictionally engage suitable notches 26, 27 and 28 provided on the bossed portion of the cover plate 19 (see Fig. 1).

On the valve shaft 4 and below the squared portion, having the valve shaft collar C mounted thereon, is loosely mounted a driving plate D having integral therewith a bushing portion provided with gear teeth to form a pinion 29. The brake valve operator casing is shaped to form two opposing and aligned cylinders 35 and 36 respectively, one of which is provided with a piston 37 having piston rings 38, and the other is provided with a guide member 39. The piston 37 and the guide member 39 are connected by a rack bar 40, each end of which is threaded and provided with nuts 41 to facilitate adjustment of the rack bar 40 with respect to the piston 37 and the guide member 39. Under normal conditions, as illustrated, the piston 37 is held in the position as shown in Fig. 3 by air pressure in the cylinder 35 acting against the tension of the spring 42 in the cylinder 36 disposed between the guide member 39 and the cylinder head 43. This cylinder head 43 is provided with a small opening 34 to allow the passage of air into and out of the cylinder 36 when the guide member 39 is changed from one position to another.

This driving plate D is provided with a cam 44 and lug 45, which are positioned that when this driving plate D is in its normal position the brake handle 22 with the handle plate H and the valve shaft collar C, which are normally locked together as heretofore explained, can be moved from the normal running position, as shown in Fig. 1, to the release position (see Fig. 1) without any interference between this driving plate D and the valve shaft collar C and its associated parts. If now the driving plate D is moved in the counter-clockwise direction (see Fig. 3), the cam 44 of the plate D will engage the trigger member 12 of the latch member L and operate the latch to disconnect the handle plate H from the valve shaft collar C as far as the movement of the valve by the handle H to the release position is concerned, the handle 22, however, being free to operate the valve 5 to the service or emergency position by the engagement of the lug 16 on the handle plate H with the lug 15 on the valve shaft collar C. Further movement of the driving plate D after the latch member has been operated causes the lug 45 of the driving plate D to engage the lug 14 of the valve shaft collar C, thereby operating the valve 5 to the service position, as more clearly described in the operation of the invention hereinafter.

The brake valve operator also includes an auxiliary exhaust valve A, comprising a valve chamber having a valve seat 46 provided with an apertured screw plug 47 in which is slidably supported a valve stem 48. This valve chamber is provided with a threaded opening 33 to facilitate connection of the same to the exhaust port of the automatic brake valve, the opening through the valve seat 46 connecting with the atmosphere. The lower extreme end of the valve stem 48 is provided with a valve 49 adapted to rest in the seat 46, and the upper extreme end of the valve stem 48 is slidably supported in the socket 50 and is urged downward by a spring 51 disposed between the socket 50 and the collar 52 pinned to said stem. The inner side of the collar 52 has a headed stud 53 provided with a roller 54 screw fastened thereto, this roller under normal conditions of the valve being positioned a distance above the handle plate H equal to the height of the cam 55 integral with the handle plate H. The valve stem 48 is prevented from being rotated by the bifurcated extension 56 extending above the screw plug 47, in which the pin 57 extending through the valve stem 48 is permitted to slide. Slidably and non-rotatably supported by the pin 58 on the valve stem 48 is a valve lifter 60, having a roller 61 journaled thereto by the stud 62. This roller 61 normally rests on the cam 63, which is integral with the driving plate D.

Integral with the valve operator casing cover 19 is formed the chamber of a valve, conveniently called the "independent release blocking valve", having a valve seat 65, and provided with a counterboard screw plug 66, in which is slidably supported the valve stem 67 having its lower end extending through a packing 64 in the valve chamber and resting on the valve lifter 60. Rigidly secured to an intermediate portion of the valve stem 67 is the valve 68, which is urged downward by the spring 69. The valve chamber of this independent release blocking valve is provided with screw-threaded openings, one above and the other below the valve seat 65. In practice, this lower opening 71 is connected to the distributing valve, whereas the upper opening 70 is connected to the independent valve of the E. T. 6 air brake equipment. The elements 72, 73, 74 and 75 are portions of the Westinghouse H—6 automatic brake valve which have no particular relation to the brake valve operator embodying the present invention, and have merely been shown to show the particular relation of the parts.

The cylinder 35 of the brake valve operator is connected to the main reservoir or the atmosphere, as the case may be, to suitable piping and an electrically operated pneumatic valve E. P. V., more clearly shown in Fig. 3. This electro-pneumatic valve consists of a top or valve portion, and a bottom or actuating portion. The valve portions comprises a chamber having three compartments 80, 81 and 82 respectively. The middle compartment 81 is connected to the cylinder 35 by a pipe 83, whereas the top compartment 80 is connected to the main reservoir by a pipe 84, and the bottom compartment 82 is connected to atmosphere by the port 85. The partitions between the several compartments are provided with tapered openings forming valve seats to cooperate with the valves 86 and 87 respectively. These valves 86 and 87 are rigidly secured to a valve stem 88 slidably supported in the screw plug 89, in a manner so that when one valve is closed the other is open. This valve stem 88 is normally urged downward by a spring 90 contained in the bottom compartment between the partition and a collar 91 pinned to the valve stem.

The operating portion of the electro-pneumatic valve comprises an iron clad electromagnet, consisting of a magnetic casing 95 supported from the main casing of a valve in any suitable manner. This magnetic casing 95 is closed by a cover 96 of non-magnetic material, and contains a solenoid 97 in which is disposed a core 98 connected to the lower end of the non-magnetic valve stem 88. On the lower extreme end of the core 98 is a disc-shaped armature 99, which in its normal energized position is disposed adjacent the solenoid 97.

In Fig. 4 has been illustrated a piping diagram of the Westinghouse E. T. 6 air brake equipment, the piping arrangement being shown substantially in the same manner as it is in text books, descriptive pamphlets and the like, it having been only slightly modified to show the application of the present invention to this system. There is only one pipe connection of any particular concern in this piping diagram as far as the present invention is concerned. This piping connection comprises the pipe commonly known as the application cylinder pipe, which comprises the pipe 105 leading from the distributing valve 106 to a three-way or T connection 107, from where it leads by a pipe 108 to the automatic brake valve and by a pipe 109 to the independent release blocking valve B heretofore described, through another pipe 110 to the independent engineer's valve 111. In the usual E. T. 6 air brake equipment, this independent release blocking valve B is not provided, and this piping diagram has been shown to illustrate the application of the present invention to this system.

The exhaust port of the H—6 automatic brake valve affords an opening to atmosphere for two purposes. In the first instance, this port allows the escape of air when a service application is being made by moving the engineer's brake valve to the service position, the air escaping through this port during such a brake application is the air that is drained from the equalizing reservoir to make a predetermined reduction therein. This reduction of pressure in the equalizing reservoir reduces the pressure above the equalizing or discharge piston and valve in the lower part of the automatic brake valve (not shown), thereby causing this equalizing discharge piston to raise to open its valve and discharge pressure from the brake pipe through another exhaust port (not shown). In the second instance if an emergency brake application is being made by moving the brake handle 22 to the emergency position, a large opening will be made between the brake pipe and the side exhaust port 112. It is thus seen that when a service brake application is being made only a very small amount of air will escape from the exhaust port 112 as compared with the total amount of air escaping from the brake pipe; whereas when an emergency brake application is made a much larger amount of air will escape from this exhaust port. In order to allow only a predetermined reduction of air pressure in the brake pipe when making a service application by the automatic apparatus embodying the present invention, this exhaust port 112 has been connected to an expansion reservoir 113 by pipes 114 and 115. In order to connect the exhaust port 112 to atmosphere directly at times when it may be desirable to make an emergency application, and also to discharge the air which has been trapped in the expansion reservoir after an automatic service application has been made, a branch pipe 116 is lead from the expansion reservoir to atmosphere through the auxiliary exhaust valve A heretofore described.

*Operation.*—Under normal conditions with the brake valve handle 22 in the running position, the mechanism and valves will be in the position as illustrated in the drawings; likewise the solenoid 97 will be maintained energized by suitable car carried train control apparatus, thus maintaining the valve 87 closed and the valve 86 open to allow air pressure from the main reservoir to flow through the pipe 84, compartment 80 into compartment 81 and then through pipe 83 into the cylinder 35 to maintain the piston 37, rack 40 and pinion 29 in the normal position against the tension of the spring 42 as illustrated.

If it is now desired to make a manual service or emergency brake application, this may be done by moving the handle 22 to the service or emergency position as desired. Such movement of the handle 22 will cause the rotary valve 5 to assume a similar position, because the handle 22 is directly connected to this valve 5 through the intervening handle plate H which is rigidly locked to the valve shaft bushing C by the latch member L. In a similar manner the handle 22 may be moved to the release position to release the brakes substantially the same as is possible by the usual brake valve not provided with the valve operator embodying the present invention. It should be noted that during such manual operation of the handle 22 the independent release blocking valve B and the auxiliary exhaust valve A will not be affected, because the valve stem 48 is maintained in its normal upward position by the cam 63 on the driving plate D, thus allowing the engineer to release the engine and tender brakes independently of the rest of the brakes by operating the independent brake valve 111. It should also be noted that when an emergency brake application is made manually that the exhaust valve does not interfere with such brake application, since this valve is maintained in the open position by the cam 63, thereby maintaining the expansion reservoir 113 at atmospheric pressure.

Let us assume now that an automatic brake application is being made by the deenergization of the solenoid 97 by suitable train control apparatus on the train (not shown). The deenergization of the solenoid 97 allows the spring 90 to seat the valve 86 and unseat the valve 87, thereby shutting off main reservoir pressure from the cylinder 35, and at the same time allowing the escape of the air pressure from this cylinder through pipe 83, chambers 81 and 82 through the exhaust port 85 to atmosphere. The release of this pressure from the cylinder 35 allows the spring 42 to drive the rack bar 40 and rotate the pinion 29 in a counter-clockwise direction (see Fig. 3). During the first part of the movement of this driving plate D in the counter-clockwise direction, the cam 63 will allow the valve lifter 60 and valve stem 48 and its associated devices to move to the lower extreme position. Further movement of the pinion 29 and the driving plate D will cause the cam 44 to engage the trigger arm 12 of the latch member L to move the latching arm 11 out of engagement with the lug 16, thereby allowing the valve shaft collar C to be moved in a counter-clockwise direction without movement of the handle plate H and the handle 22. Further rotation of the driving plate D in the counter-clockwise direction causes the lug 45 of this plate D to engage the lug 14 of the collar C, and thereby move this collar C with the driving plate D until the rotary valve 5 is in the service brake applying position at which time the rack bar 40 will strike the cylinder head 30 of the cylinder 35.

When the rotary valve 5 has been automatically moved to the service position as just explained, this valve 5 will open a small port between the equalizing reservoir and the usual exhaust port 112. Since, however, the auxiliary exhaust valve A is closed at this time, this air can not escape to atmosphere but will be confined in the expansion reservoir 113 connected to this exhaust port 112. This connection between the equalizing reservoir and the expansion reservoir 113 allows the pressure in the equalizing reservoir to fall until the pressure in both of these reservoirs are equal. The ratio of volume of the equalizing reservoir to that of the volume of the expansion reservoir is selected such that this fall in pressure in the equalizing reservoir will be sufficient to make the desired service brake application. If a full service application is wanted, this ratio is made substantially the same as the ratio of the auxiliary reservoir on each car to that of the brake cylinders on such car.

If now the application of the brakes by the automatic apparatus is to be discontinued, the solenoid 97 will again be energized, thus allowing air pressure to flow from the main reservoir through the pipe 84, chambers 80 and 81 through the pipe 83 into the cylinder 35. The flow of pressure fluid into the cylinder 35 will move the piston 39, rack 40 and driving plate D back to the normal position. The valve shaft collar C will, however, not be returned, there being no positive engagement between the driving plate D and this collar C in the clock-wise direction of rotation of the driving plate D, that is, the brakes will not be released.

Assuming that the engineer is on the job, is willing and able to again take charge of the train, he may do so by moving the handle 22 to the service position whereby the sloped part 31 of the latching arm 11 coming in engagement with the sloped portion of the lug 16, will cause the latching arm 11 to slide up over the lug 16 to again lock the lug 16 between the lug 15 and latching arm 11, thereby locking the handle plate H to the valve shaft collar C after which the brakes may be released manually in the usual manner, this latching being possible in the service position of the rotary brake valve 5 because of the friction of this valve on its seat, that is, less force is necessary to cause the latching arm 11 to rise over the lug 16 than is necessary to move the rotary valve beyond the service position. It should also be noted that when the apparatus is moved back to its normal position that the auxiliary exhaust valve A will again be opened, thereby allowing the air that has been trapped in the expansion reservoir to escape to atmosphere.

Let us assume now that it is attempted by the engineer to release the brakes by operating the handle 22 to the release position (see Fig. 1) after the brakes have been and are still being applied by the automatic brake valve operator, as heretofore explained. Although he may move the handle to the release position, such movement will not release the brakes because this brake handle 22 and the handle plate H are unlocked from the collar C, as far as movement in the counter-clockwise direction of the handle 22 is concerned, and therefore he can not prevent the application of the brakes automatically by such movement of the handle 22. Let us assume now that the engineer tries to defeat the purpose of the automatic brake applying means, particularly if running engine and tender alone, by releasing the engine and tender brakes in the usual manner. This ordinarily may be accomplished by operating the independent brake valve 111 to the independent release position, thereby allowing the escape of air from the application cylinder through the application cylinder pipes 105, 109 and 110. Such operation of the independent brake valve 111 will be of no avail because the independent release blocking valve B is closed, thereby preventing the escape of air from the application cylinder.

Let us assume now that the engineer wishes to stop the train quicker than what could be accomplished by a service brake application, while such an automatic brake application is being made, and that he moves his handle to the emergency brake applying position (see Fig. 1). The movement of the handle 22 in the counter-clockwise direction toward the emergency brake applying position is ineffective during its first arc of movement. As soon as the service position is reached, the lug 16 integral with the handle plate H will engage the lug 15 integral with the valve shaft collar C, thereby allowing movement of this collar C, the valve shaft 4 and the rotary valve 5 in a counter-clockwise direction.

Upon further movement of the handle 22, the cam 55 integral with the handle plate H engages the roller 54 to again raise the valve stem 48 and its associated parts to the upper and normal position. When the emergency position has finally been reached by such movement of the brake handle 22 by the engineer, a large port in the rotary valve 5 will be opened between the brake pipe and the usual exhaust port 112. This will allow brake pipe pressure to flow through the usual exhaust port 112, through the pipes 114 and 116, through the auxiliary exhaust valve A to atmosphere. It should be noted that if a manual emergency brake application is made after an automatic service application as just explained, that although the valve 49 of the auxiliary exhaust port A is moved to its upper normal position, the independent release blocking valve B will be maintained closed. This operating feature is present because the valve lifter 60 is free to be moved in one direction with respect to the valve stem 48, thus allowing the valve lifter 60 to lift both of these valves whereas the roller 54 can only lift one of these valves, namely, the valve 49.

An automatic brake valve operator has thus been superimposed on the usual engineer's brake valve which will unlatch the engineer's handle when an automatic operation is being made, in a manner so that he can not release the brakes, but may apply them harder by making an emergency brake application. This automatic brake valve operator also provides means for making a limited predetermined reduction in the brake pipe pressure, thereby preventing the escape of more air than is necessary to make the desired partial or full service brake application. Such limited reduction in brake pipe pressure is considered to be desirable in an automatic train control system for a number of reasons. For one thing, the energy necessary to replace the wasted air is saved. Also, with certain types of modern air brake equipment, reduction in brake pipe pressure below a certain minimum results in an emergency application of the brakes which, if a full service application is effective at the time, may be unnecessary so far as safe stopping of the train is concerned, and may slide the wheels and produce objectionable wear and tear on the equipment. Furthermore, venting of the brake pipe below the point of equalization delays recharging of the brake pipe and the auxiliary reservoirs on the cars, with the result that more than the ordinary or normal time is taken in recharging the system; and under certain conditions, especially upon long down grades, an automatic brake application, accompanied by a continued reduction in brake pipe pressure greater than that necessary to obtain effective braking, may be dangerous on account of such abnormal length of time taken to recharge the system. In this connection, it should be noted that the desired limited reduction in brake pipe pressure is obtained in accordance with this invention only for service and only at the time of an automatic application, so that there is no interference with the amount of reduction in brake pipe pressure in the case of a manual service application under ordinary conditions, or in the case of an emergency application after an automatic brake application has been initiated.

Means has also been provided to prevent the engineer from defeating the purpose of the automatic brake applying means by releasing the brakes on the engine and tender. This is of particular importance in those cases where the engine and tender are running alone without a train, because with the ordinary E. T. equipment, it would be within the power of the engineer under such circumstances and unless special provisions were made as in this invention, to defeat all automatic control of the engine and tender by manipulation of his independent brake valve.

All of these features have been accomplished by using as much of the standard air brake equipment as possible, thereby reducing the expense in modifying the usual air brake equipment, and further avoiding interference between certain of the regular air brake equipment and the equipment necessary to make an automatic brake application.

In order to explain the nature of the present invention and the functions and mode of operation of the means constituting the same, there has been shown and described one typical embodiment thereof which has been selected more with a view of facilitating explanation of the invention, than for the purpose of disclosing the specific structure and arrangement of parts preferably employed in practice; and it should be understood that various modifications, deviations and additions may be made from the particular embodiment illustrated without departing from the invention.

What I claim as new and desire to secure by Letters Patent of the United States, is:—

1. In an automatic brake valve operator, the combination with an engineer's brake valve, of means for automatically actuating said valve to the service brake applying position and for simultaneously releasing the operative connection between the brake valve handle and the valve and for preventing operation of the valve by the handle toward the release position, but maintaining such operative connection for movement of the valve by the handle toward the service and emergency position.

2. In an automatic brake valve operator adapted to be fastened to the engineer's brake valve casing comprising, an operating member operatively fastened to the rotary valve of said brake valve, manually operative means including a handle normally locked to said operating member, and automatically operated means which when operated to its active position will first unlock said handle from said operating member and then move the operating member and the rotary valve to the service brake applying position.

3. Automatic brake applying apparatus for venting the brake pipe of trains to a predetermined extent, comprising an engineer's brake valve having an exhaust port, an equalizing reservoir, automatic means for moving the brake valve to the service brake applying position in which it vents said equalizing reservoir, an expansion reservoir connected to the exhaust port leading from said equalizing reservoir through said engineer's valve, and means for connecting said expansion reservoir to atmosphere while said brake valve is in its normal running position.

4. Automatic brake applying apparatus for railway trains for applying the brakes thereof by venting the brake pipe to a predetermined extent only, comprising an air brake system including a normally charged brake pipe, and engineer's brake valve, and an equalizing reservoir on the engine, triple valves, auxiliary reservoirs, and brake cylinders, on the following train, automatic means for moving the engineer's brake valve to the service brake applying position in which it vents the equalizing reservoir, an expansion reservoir connected to the exhaust port leading from said equalizing reservoir through said engineer's brake valve, and means for connecting said expansion reservoir to atmosphere when said brake valve is in either its normal running position or in the emergency brake applying position.

5. Automatic brake applying apparatus for railway trains, comprising an engine and tender air brake equipment including an automatic brake valve, an independent brake valve and a distributing valve, an application cylinder pipe connecting said independent valve and distributing valve, and automatic means actuated under certain predetermined conditions for moving said automatic brake valve to the service brake applying position and for simultaneously blocking the application cylinder pipe.

6. A brake valve operator for automatic train control systems comprising, a casing attached to the engineer's brake valve casing having two opposed and aligned cylinders, a piston in one of said cylinders and a guide member in the other, a rack connecting said piston and guide member, a compression spring behind said guide member in one of said cylinders, and means for controlling the flow of pressure fluid to and from the other of said cylinders.

7. A brake valve operator comprising, a member operatively connected to the rotary valve of an engineer's brake valve, a spring-pressed latch supported by said member, manual operable means disposed above said member locked to said member by said latch, and power operated means disposed below said member adapted to unlock said latch when moved toward its active position and engage said member to move it to its brake applying position.

8. In an automatic brake valve, the combination with an engineer's brake valve, of automatic means for actuating said valve to the service brake applying position, an equalizing reservoir, an expansion reservoir, and means for confining the air escaping from said equalizing reservoir through said valve into said expansion reservoir when a service brake application is made by said automatic means and for releasing the air so confined when such a service brake application is discontinued.

9. In an automatic brake valve, the combination with an engineer's brake valve, of automatic means for actuating said valve to the service brake applying position, an equalizing reservoir, an expansion reservoir, means for confining the air escaping from said equalizing reservoir through said valve into said expansion reservoir when a service brake application is made by said automatic means and for releasing the air pressure so confined when said automatic means is returned to normal, and means for automatically releasing the air so confined when the brake valve is moved to the emergency position manually.

10. Automatic brake control apparatus superimposed upon an engine and tender type air brake equipment including a normally charged brake pipe, an engineer's main brake valve, an engineer's independent brake valve, an equalizing reservoir and a distributing valve, and comprising normally inactive brake applying means which if actuated causes venting of the brake pipe to effect a brake application and which prevents the engineer from recharging the brake pipe by the main brake valve, and means operated simultaneously with the operation of said brake applying means for preventing the escape of air from the application cylinder pipe leading from the distributing valve to the atmosphere through the independent valve while the independent valve is in the release position.

11. A brake valve operator comprising, a member operatively connected to the rotary valve of an engineer's brake valve, a spring pressed latch supported by said member, manually operable means disposed near said member locked to said member by said latch, and power operated means disposed adjacent to said member and adapted to unlock said latch when moved toward its active position during which movement it engages said member and moves it and the rotary valve to a brake applying position.

12. An automatic brake valve actuator adapted to be superimposed upon an engineer's brake valve for operating said valve to a brake applying position in a manner so that the engineer can not prevent an automatic brake application comprising, automatically operable mechanism having a handle associated therewith, said mechanism including locking means for locking said handle to the rotary valve of said engineer's valve, said mechanism also having a member associated therewith adapted to engage the rotary valve and move the same to a brake applying position if said mechanism is operated, and means for unlocking said handle from said rotary valve by operating said locking means when said mechanism is operated.

13. Automatic brake control apparatus for controlling the air brakes of trains having a braking system where a main brake valve is provided for controlling the brakes of the train and an independent brake valve is provided for controlling the brakes of the engine and tender alone comprising, means automatically controlled for venting the brake pipe to cause an application of the brakes of both the train and the engine and tender, said means including means for preventing the engineer from releasing the brakes either by moving the main brake valve to the running or release position or by moving the independent brake valve to the release position.

14. In an automatic train control system, the combination with an engine and tender air brake system of the type in which the brake pipe is normally charged and in which venting of the brake pipe effects a brake application, including a main and an independent brake valve, a brake pipe, a distributing valve and an equalizing reservoir; and means for automatically applying the brakes to cause only a predetermined reduction of pressure in the brake pipe and a corresponding degree of brake application in a manner so that the engineer cannot release the train brakes by recharging the brake pipe through the medium of the main brake valve or release the engine and tender brakes by moving the independent valve to the release position comprising; means for actuating the rotary valve of the main brake valve to the service position in a manner so that the engineer cannot return it to the release position, means for confining the air escaping from the equalizing reservoir while the rotary valve is in such position so that it can only vent to a predetermined extent, and means for blocking the escape of air from the distributing valve through the independent valve while and so long as the rotary valve of the main brake valve is maintained in said service position by said automatic brake applying means.

15. In a combined manual and automatic brake valve, the combination with a brake valve housing provided with a rotary valve, a handle controlling said valve connected thereto by a disengageable latch, and automatic means for operating said valve and simultaneously disengaging said latch.

16. A combined manual and automatic brake valve for controlling the brakes of an air brake system of the type in which venting of the brake pipe effects a brake application comprising, a normally charged brake pipe, an engineer's brake valve housing, a rotary valve in said housing, a handle operatively connected to said valve to permit said valve to be moved to the emergency position by said handle at all times, means including a latch operatively connecting said handle to said valve for permitting movement of said valve toward the release position, and means for automatically moving said valve to the service brake applying position and simultaneously therewith disengaging said latch.

17. A combined manual and automatic brake valve as specified in the preceding claim, further characterized by the provision of means for permitting a predetermined reduction only in pressure in said brake pipe effective only when said valve is moved to the service position automatically.

18. In an air brake system of the type in which a reduction in the brake pipe pressure causes an automatic application of the brakes including a brake pipe, an engineer's brake valve, and an equalizing reservoir; and means for venting said equalizing reservoir to a predetermined extent only by placing it into communication with a capacity reservoir of a predetermined volume when the brake valve is placed in the service position and venting said capacity reservoir to atmosphere when the brake valve is moved to the release position.

19. Brake control apparatus for air brake systems of the engine and tender type including a main brake valve, an independent brake valve, a distributing valve and an equalizing reservoir, and means for automatically venting the brake pipe to cause a brake application and for simultaneously therewith blocking the discharge passage leading from the distributing valve to atmosphere through the independent brake valve, whereby upon an automatic brake application the engine and tender brakes can not be released by moving the independent brake valve to the release position.

20. In a braking system, the combination with an engineer's brake valve, a handle disengageably connected to the rotary valve of said brake valve, and means operated automatically for moving said rotary valve to the service position and simultaneously disconnecting said handle from said rotary valve.

21. In a braking system of the type in which if the brake pipe is vented an automatic brake application occurs, including an engineer's brake valve, a handle disengageably connected to the rotary valve of said brake valve, means operated automatically for moving said rotary valve to the service position and simultaneously disconnecting said handle from said rotary valve, and means effective if the rotary valve is moved to the service position for venting of the brake pipe to a predetermined extent only.

22. In a braking system of the type in which venting of the brake pipe effects a brake application, the combination with brake control apparatus including an engineer's brake valve which if operated to the service position vents the brake pipe, automatic means for actuating said valve to the service position, and means limiting the venting of the brake pipe to a predetermined extent if the brake valve is moved to the service position automatically.

23. In a braking system, the combination with brake control apparatus including an engineer's brake valve which when in its normal position effects charging of the brake pipe to a predetermined pressure, automatic means for actuating said valve from normal to a position to prevent said valve from recharging the brake pipe and acting to vent the usual equalizing reservoir, and means for limiting the extent of venting of said equalizing reservoir only when it is being vented automatically.

24. In a braking system of the type in which if the brake pipe is vented an application of the brakes occurs, the combination of an engineer's brake valve, means for automatically moving said valve toward the brake applying position, and means for limiting the reduction of pressure in the brake pipe effective only when the valve is operated automatically.

25. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising, a brake applying device, manually operable means for effecting movement of said device to its brake applying position in which position it vents said equalizing reservoir, automatic means for operating said device to a brake applying position, and means effective if said device is operated automatically for limiting the reduction of pressure in the equalizing reservoir as a result of operation of said device.

26. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising, a brake applying device which when in its active position prevents further charging of said brake pipe and equalizing reservoir by fluid pressure and effects venting of said equalizing reservoir, manually operable means for effecting movement of said device to its brake applying position in which position it vents said equalizing reservoir, automatically operable means for operating said device to such brake applying position, and means effective if said device is operated automatically for limiting the reduction of pressure in the equalizing reservoir as a result of operation of said device.

27. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising, a brake applying device, manually operable means for effecting movement of said device to its brake applying position in which position it vents said equalizing reservoir into a chamber having an exhaust port, automatically operable means for operating said device to such brake applying position, and means effective if said device is operated automatically for closing said exhaust port.

28. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising, a reduction reservoir having an exhaust port, a brake applying device which when in its normal position maintain said exhaust port open and when in a service brake applying position connects said equalizing reservoir to said reduction reservoir, manually operable means for effecting movement of said device to its brake applying position in which position it vents said equalizing reservoir, and automatically operable means for operating said device to such brake applying position and closing said exhaust port.

29. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising; an engineer's brake valve having a running, a service and an emergency position arranged in successive order; an expansion reservoir; said engineer's valve being constructed and arranged so that the expansion reservoir is connected to atmosphere when the brake valve is in the running position, is connected to the equalizing reservoir when the brake valve is in the service position and is connected to atmosphere when the brake valve is in the emergency position.

30. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than the pressure in the equalizing reservoir comprising; an engineer's brake valve having a running, a service and an emergency position arranged in successive order; an expansion reservoir; said engineer's valve being constructed and arranged so that the expansion reservoir is connected to atmosphere when the brake valve is in the running position, is connected to the equalizing reservoir when the brake valve is in the service position and is connected to atmosphere when the brake valve is in the emergency position; and means controlled automatically by suitable train control mechanism for operating said valve.

31. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising; an engineer's brake valve having a running, a service and an emergency position arranged in successive order; an expansion reservoir; said engineer's valve being constructed and arranged so that the expansion reservoir is connected to atmosphere when the brake valve is in the running position, is connected to the equalizing reservoir when the brake valve is in the service position and is connected to atmosphere when the brake valve is in the emergency position; means controlled automatically by suitable train control mechanism for operating said valve to the service position in a manner so that the engineer can not prevent automatic operation of the valve.

32. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising; an engineer's brake valve having a running, a service and an emergency position arranged in successive order; an expansion reservoir, said engineer's valve being constructed and arranged so that the expansion reservoir is connected to atmosphere when the brake valve is in the running position, is connected to the equalizing reservoir when the valve is in the service position and is connected to atmosphere when the valve is in the emergency position; said engineer's valve having a handle for operating it manually; and means automatically operated for simultaneously disconnecting said handle from said valve and for operating said valve to the service position.

33. Combined manual and automatic brake applying mechanism for air brake systems of the type in which a brake pipe is normally charged and connected with a source of fluid pressure and in which venting of the brake pipe effects a brake application comprising, a brake applying device which when in its brake applying position effects venting of the brake pipe and isolation of said brake pipe from said source of fluid pressure, manually operable means for effecting movement of said device to its brake applying position in which position it vents said brake pipe, automatically operable means for operating said device to such brake applying position, and means for limiting the reduction of pressure in the brake pipe when said device assumes its active position effective only if said device has been operated to such position automatically.

34. Combined manual and automatic brake applying mechanism for air brake systems of the type in which a brake pipe is normally charged and connected with a source of fluid pressure and in which venting of the brake pipe effects a brake application comprising, a main brake valve which when in its brake applying position effects venting of the brake pipe and isolation of said brake pipe from said source of fluid pressure whereby said venting of said brake pipe causes the brakes of the engine and tender and the train brakes to be applied, an independent brake valve for releasing the engine and tender brakes, means controlled automatically by suitable train control mechanism for operating said main brake valve to the brake applying position in a manner so that the engineer can not prevent its operation and for also operating suitable mechanism for preventing the engineer releasing the engine and tender brakes by operation of said independent valve.

35. In a braking system, the combination with an engineer's brake valve having a rotary valve therein; mechanism including a handle for operating said rotary valve to the release, the running and the brake applying position; automatic means for operating said rotary valve; said mechanism being constructed so as not to permit said rotary valve to be moved toward the release position manually when it is automatically operated even through the force produced by the automatic means is less than that exertable by the engineer.

36. In a braking system, the combination with an engineer's brake valve having a rotary valve therein; manually operable means for operating said rotary valve from normal in one direction to a brake applying position and in the other direction to a brake releasing position, automatic means for operating said rotary valve, said manually operable means not permitting said rotary valve to be operated toward the release position manually when it is operated to a brake applying position automatically even though the operating force of the automatic means is less than that exertable by the engineer.

37. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising, a brake applying device, manually operable means for effecting movement of said device to its brake applying position in which position it vents said equalizing reservoir, automatic means for operating said device to a brake applying position, and means effective only if said device is operated automatically for limiting the reduction of pressure in the equalizing reservoir as a result of operation of said device.

38. The combination with a brake application valve device and a brake valve device for controlling the release of the brakes, of means controlled by said application valve device for controlling communication through which the release of the brakes is effected by manipulation of said brake valve device.

39. In a train control equipment, the combination with an application valve device for effecting an application of the brakes and a brake valve device operable by the engineer for effecting the release of the brakes, of means operative when said application valve device is acting to effect an application of the brakes for preventing the release of the brakes by operation of the brake valve device.

40. The combination with an independent brake valve device for controlling the release of the brakes on the locomotive, of an application valve device for effecting an application of the brakes, and means controlled by said application valve device for preventing the release of the brakes on the locomotive by the operation of said brake valve device.

41. The combination with an independent brake valve device for controlling the release of the brakes on the locomotive, of an application valve device for effecting an application of the brakes, and means for preventing the release of the brakes on the locomotive by operation of said brake valve device upon operation of said application valve device to effect an application of the brakes.

42. Combined manual and automatic brake applying mechanism for air brake systems of the type in which an equalizing reservoir and a brake pipe are normally charged with fluid pressure and in which an equalizing discharge piston valve vents the brake pipe to atmosphere when the pressure in the brake pipe is higher than that in the equalizing reservoir comprising, a brake applying device, manually operable means for effecting movement of said device to its brake applying position in which position it vents said equalizing reservoir, and automatic means for operating said device to a brake applying position in a manner so that an automatic brake application cannot be prevented by operation of said manual operable means.

43. Brake applying apparatus for automatic air brake systems of the type in which a brake pipe is normally charged and in which if the brake pipe pressure is reduced an automatic brake application occurs, the combination with an equalizing reservoir normally charged to brake pipe pressure, an equalizing discharge piston valve constructed and arranged to vent the brake pipe to atmosphere when the pressure in the brake pipe is higher than the pressure in the equalizing, manually operable means for effecting any degree of venting of said equalizing reservoir, and automatic means for effecting venting of said equalizing reservoir to a limited extent only.

44. Brake applying apparatus for automatic air brake systems of the type in which a brake pipe is normally charged and in which if the brake pipe pressure is reduced an automatic brake application occurs, the combination with an equalizing reservoir normally charged to brake pipe pressure, an equalizing discharge piston valve constructed and arranged to vent the brake pipe to atmosphere when the pressure in the brake pipe is higher than the pressure in the equalizing reservoir, manually operable means movable to a charging position for charging the brake pipe and movable to a brake applying position for venting of said equalizing reservoir, and automatic means for effecting venting of said equalizing reservoir to a limited extent only, said automatic means when actuated venting said equalizing reservoir and preventing charging of the brake pipe by said manually operable means notwithstanding operation of said manually operable means to a charging position.

45. Brake applying apparatus for automatic air brake systems of the type in which a brake pipe is normally charged and in which if the brake pipe pressure is reduced an automatic brake application occurs, the combination with an equalizing reservoir normally charged to brake pipe pressure, an equalizing discharge piston valve constructed and arranged to vent the brake pipe to atmosphere when the pressure in the brake pipe is higher than the pressure in the equalizing reservoir, means including a manually operable handle which if moved in one direction causes charging of said brake pipe and equalizing reservoir and if moved in the other direction vents said equalizing reservoir, automatic means for venting said equalizing reservoir, and interlocking means for preventing charging of said brake pipe and equalizing reservoir by movement of said manually operable handle while said automatic means is venting said equalizing reservoir in spite of movement of said handle in a direction to charge said brake pipe.

46. Brake applying apparatus for automatic air brake systems of the type in which a brake pipe is normally charged and in which if the brake pipe pressure is reduced an automatic brake application occurs, the combination with an equalizing reservoir normally charged to brake pipe pressure, an equalizing discharge piston valve constructed and arranged to vent the brake pipe to atmosphere when the pressure in the brake pipe is higher than the pressure in the equalizing reservoir, means including a manually operable handle which if moved to one position causes charging of said brake pipe and equalizing reservoir and if moved to another position vents said equalizing reservoir to atmosphere, automatic means for venting said equalizing reservoir into an expansion reservoir, said manually operable handle if moved to a certain position vents said expansion reservoir to atmosphere whereby a greater reduction in equalizing reservoir pressure may be obtained by suitable movement of said handle while said automatic means is operated.

47. Brake applying apparatus for automatic air brake systems of the type in which a brake pipe is normally charged and in which if the brake pipe pressure is reduced an automatic brake application occurs, the combination with an equalizing reservoir normally charged to brake pipe pressure, an equalizing discharge piston valve constructed and arranged to vent the brake pipe to atmosphere when the pressure in the brake pipe is higher than the pressure in the equalizing reservoir, said mechanism being constructed so as not to permit said rotary valve to be removed to the release position when said automatic means is operated in spite of movement of said handle to the release position.

48. In a combined manual and automatic engineer's brake valve, the combination with the usual rotary valve, of automatic means for actuating said rotary valve to a brake applying position, and manually operable means for operating said rotary valve which if operated to a brake applying position is effective at all times and if operated toward the release position is only effective when said automatic means is in its ineffective position.

In testimony whereof I hereto affix my signature.

CHARLES S. BUSHNELL.